United States Patent [19]
Horn

[11] Patent Number: 6,050,639
[45] Date of Patent: Apr. 18, 2000

[54] SEAT COVER FOR PROTECTING A MOTOR VEHICLE SEAT

[75] Inventor: Joachim Horn, Schwalmstadt-Treysa, Germany

[73] Assignee: Horn & Bauer GmbH & Co., KG, Schwalmstadt, Germany

[21] Appl. No.: 09/282,844

[22] Filed: Mar. 31, 1999

[30] Foreign Application Priority Data

Apr. 17, 1998 [DE] Germany ............................ 198 17 058

[51] Int. Cl.[7] ............................................. A47C 27/00
[52] U.S. Cl. ...................................... 297/229; 297/228.1
[58] Field of Search ............................. 297/219.1, 228.1, 297/229, 218.1

[56] References Cited

U.S. PATENT DOCUMENTS

| | | | |
|---|---|---|---|
| 3,695,692 | 10/1972 | Williams | 297/229 |
| 4,840,841 | 6/1989 | Madsen | 297/219.1 X |
| 4,884,839 | 12/1989 | Keiswetter | 297/219.1 |
| 5,709,431 | 1/1998 | Horn | 297/219.1 X |
| 5,806,925 | 9/1998 | Hanley | 297/229 |

FOREIGN PATENT DOCUMENTS

| | | | |
|---|---|---|---|
| 3338290 | 4/1984 | Germany | 297/219.1 |
| 91/17683 | 11/1991 | WIPO | 297/219.1 |

*Primary Examiner*—Milton Nelson, Jr.
*Attorney, Agent, or Firm*—Thomas, Kayden, Horstemeyer & Risley

[57] ABSTRACT

A temporary seat cover (1) for protecting a motor vehicle seat (26) is made of a majority of layers of plastic film. The motor vehicle seat (26) includes a seat cushion (27), a backrest (29), and a gap (33) being located between the seat cushion (27) and the backrest (29). The seat cover (1) includes a front layer (7) made of plastic film and extending along the seat cushion (27) and the backrest (29). A rear layer (8) made of plastic film is connected to the front layer (7) by transverse welding seams (9, 19). A backrest pocket (6) receives at least a portion of the backrest (29). The backrest pocket (6) is formed by the front layer (7) and the rear layer (8). A seat pocket (5) for the receives at least a portion of the seat cushion (27). The seat pocket (5) is formed by the front layer (7) and the rear layer (8). A strip-shaped (34) extension is connected to one of the layers (7, 8) and it is designed and arranged to be moved through the gap (33). A glue film (35) is arranged on the strip-shaped extension (34) and it is covered by a removable cover strip (36). The cover strip (36) is removed prior to connecting the strip-shaped extension (34) to a portion of the cover seat (1) or directly to the motor vehicle seat (26). A sealing effect preventing undesired manipulation of the seat cover (1) and the seat (26) is attained.

15 Claims, 6 Drawing Sheets

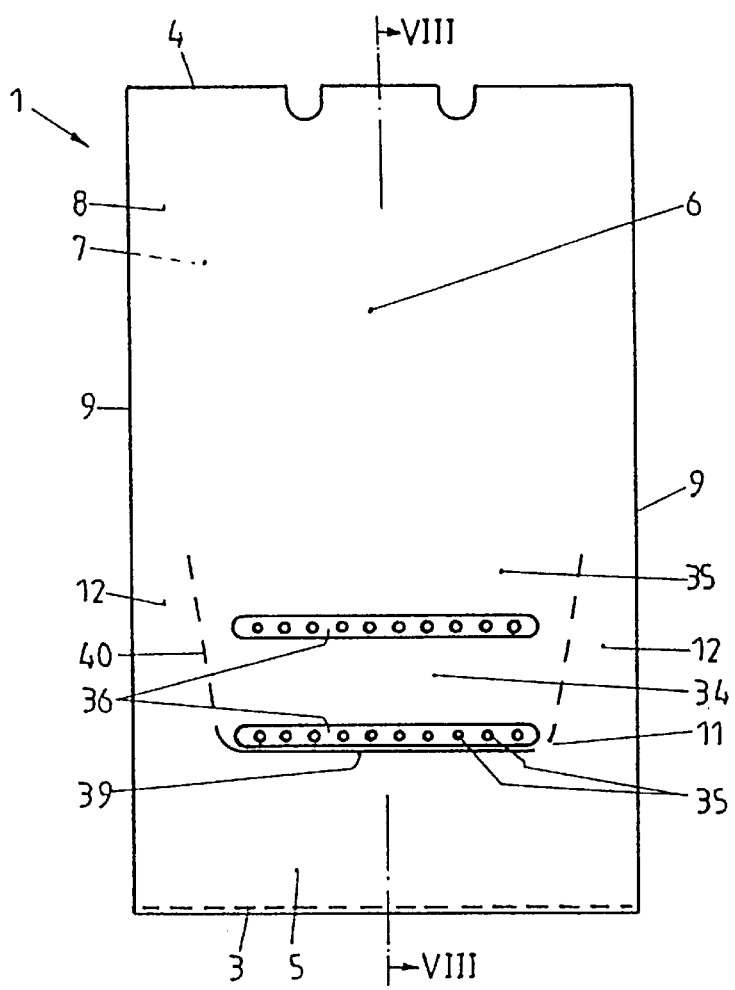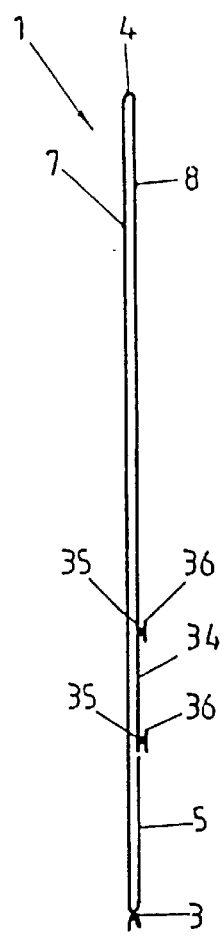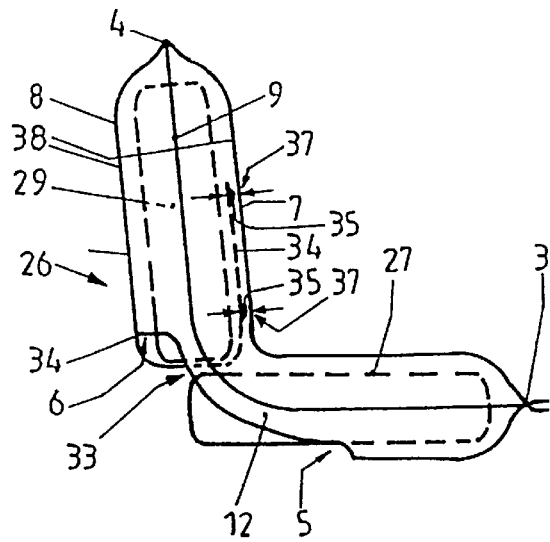
Fig. 7
Fig. 8
Fig. 9

SEAT COVER FOR PROTECTING A MOTOR VEHICLE SEAT

CROSS REFERENCE TO RELATED APPLICATIONS

This application claims the benefit of co-pending German patent application serial No. 198 17 058.0 entitled "Sitzbezug zum Schutz eines Kraftfahrzeug-Sitzes aus einem doppellagigen Teil aus Kunststoffolie", filed on Apr. 17, 1998.

FIELD OF THE INVENTION

The invention generally relates to a seat cover for protecting a motor vehicle seat. More particularly, the present invention relates to a temporary seat cover made of plastic film for protecting a motor vehicle seat. Motor vehicle seats include a seat cushion, a backrest and a gap being located between the seat cushion and the backrest. The seat cover includes a seat pocket surrounding at least portion of the seat cushion. The seat cover is designed to be used once or several times in garages during repair, inspection and the like of motor vehicles. More particularly, the seat cover may be utilized for a single use in the production process in which vehicle seats are manufactured. The seat cover remains mounted on the manufactured vehicle seat during transport and mounting of the seat in a vehicle chassis, and even on the way to the dealer.

BACKGROUND OF THE INVENTION

Seat covers made of plastic film are put on or pulled over a vehicle seat to protect the seat from dirtying by workers or other people getting in contact with the seat. Such seat covers are known in garages if a repair or an inspection of the vehicle has to be performed. Even during the first mounting or assembly of a vehicle in an automobile factory, there is the danger of undesired dirtying or harming the seats. This danger of dirtying even begins at the manufacturer of the vehicle seat, and during transport to the automobile factory. This danger remains present when putting the seats to conveyor equipment leading to the assembly line. Next, the vehicle seats have to be placed into the chassis of the vehicle. During this mounting operation, a large number of workers one after the other get in contact with the seats. Finally, the assembled vehicle has to be driven off the assembly line and onto trucks or railway wagons for transport, and the vehicle has to be moved several times at the dealer prior to sale and delivery to the individual customer.

Vehicle seats may get at least 50 times or more in contact with workers and other persons from the manufacture of the seat by the provider to the delivery of the vehicle to the customer, so that there is a great danger of dirtying the seats. To counteract this danger of dirtying the seats, seat covers made of plastic film are known in the art. These seat covers are often put on the seat at the place of the seat manufacturer, but at the latest at the place of the vehicle manufacturer. These seat covers are put on the seats, in particular the seat of the driver, and they are removed before delivery to the customer of the automobile. Such seat covers for new cars do not substantially differ from such seat covers which are used during repair or inspection of the vehicle. They may be made of a comparatively thick plastic film even lasting during heavier use.

A seat cover for protecting a motor vehicle seat is known from German Patent Number DE 42 10 232 C2. The seat cover includes two pockets in its end regions. The seat pocket serves to receive a portion of the seat cushion, and the backrest pocket is adapted to receive a portion of the backrest of the seat. The seat cover includes a front layer being designed to be longer than the sum of the usable length of the backrest and the seat cushion. Due to the long design of the front layer, it is possible to fold the front layer in this region generating a fixing fold, and to clamp this fixing fold in the gap between the backrest and the seat cushion. The fixing fold is closed on both sides of the seat. The fixing fold mainly serves to fix the seat cover in the region of the gap. The fold is clamped or jammed by the tension being usually present between the backrest and the seat cushion. This is advantageous, since the portion of the front layer protecting the backrest and the portion of the front layer covering the seat cushion are held closer and tighter on the seat. There is the additional advantage that the danger of an undesired displacement of the seat cover is reduced, in particular in the region of the gap, so that there are almost no surfaces of the seat which are not protected by the seat cover.

But there are also motor vehicle seats in which the gap between the seat cushion and the backrest has dimensions of several centimeters, so that a clamping or jamming effect of a seat cover to be mounted on the seat does not occur. Even if a clamping effect does occur, there is no great maximum force which can be transmitted by this clamping connection. During the assembly of the motor vehicle seat, this force in the clamping gap can be easily exceeded, so that the fixing fold slides out off the gap, and its function of fixing the seat cover in the desired position is no longer fulfilled.

Such a clamped or jammed fixing fold has no sealing effect for the seat, and it does not provide a proof of the motor vehicle seat being the original seat. There is always the danger of the seat cover sliding out of place or even being removed. It is even possible that workers remove the seat cover since they do not like to sit on the plastic material, especially during summertime and corresponding high temperatures in the factory. Consequently, there is a great danger of the seat getting dirty.

Another seat cover for protecting a motor vehicle seat is known from German Patent Number DE 196 45 999 C1. The seat cover includes two pockets in its end regions. The seat pocket serves to receive a portion of the seat cushion, and the backrest pocket is adapted to receive a portion of the backrest of the seat. The rear layer partially forming the seat pocket includes a protecting member being formed by a cutout. The protecting member has a U-shape, and it covers the sides portions of the seat cushion. The front layer of the seat cover includes a protecting element for covering the joint regions of the seat at each side of the gap being located between the backrest and the seat cushion. The seat cover is based on the idea to provide the seat pocket and other elements of the seat cover with an improved protecting function. For this reason, the rear layer partially forming the seat pocket includes a protecting member extending around the seat cushion and covering the seat cushion in a U-shape in the lateral and in the lower region of the seat cushion. The protecting member does not only fulfil a protecting function, but it at the same time improves the fit of the seat pocket in the mounted position of the seat cover on the motor vehicle seat. The danger of the seat cover sliding out of place, and of the seat getting dirty is partially reduced.

SUMMARY OF THE INVENTION

The present invention relates to a temporary seat cover for protecting a motor vehicle seat. The seat cover includes a front layer made of plastic film and extending along the seat cushion and the backrest of the seat. A rear layer made of plastic film is connected to the front layer by transverse welding seams. A backrest pocket receives at least a portion of the backrest, the backrest pocket being formed by the front layer and the rear layer. A seat pocket receives at least a portion of the seat cushion, the seat pocket being formed by the front layer and the rear layer.

The temporary seat cover for protecting a motor vehicle seat according to the present invention includes a strip-shaped extension being connected to one of the layers and being designed and arranged to be moved through the gap being located between the seat cushion and the backrest. A glue film is arranged on the strip-shaped extension, and it is covered by a removable cover strip. The strip-shaped extension can be connected to the seat cover by the glue film after taking the cover strip off the glue film. It is also possible to connect the strip-shaped extension directly to a portion of the motor vehicle seat after taking the cover strip of the glue film.

The invention is based on the idea to provide the seat cover with a strip-shaped extension, for example a bracket or the like. The extension is designed and arranged to be movable through the gap being located between the backrest and the seat cushion, and a little bit further on, in the mounted position of the seat cover on the motor vehicle seat. The strip-shaped extension may be an integral part of the front layer or of the rear layer of the seat cover. It is also possible to separately produce the extension, and to connected it to the front layer or to the rear layer of the seat cover, for example by gluing it to the plastic film.

The strip-shaped extension itself includes a glue film being covered by a removable cover strip. Thus, the glue film is activated after pulling off the cover strip. The glue film can be connected to a portion of the seat cover, or alternatively to a portion of the motor vehicle seat, for example a portion of the frame or the like. Since the strip-shaped extension extends through the gap being located between the backrest and the seat cushion, it together with other portions of the seat cover forms an annular closed revenue in its connected position. The revenue, for example, surrounds the seat cushion or the backrest, so that the original status of the seat is secured. The motor vehicle seat is sealed by the mounted seat cover having a glued extension, so that there is a certain guaranty that the seat cover remains in its wanted position on the seat during transport from the producer of the seat to the producer of the motor vehicle, as well as during assembly of the seat in the chassis of the motor vehicle. When the strip-shaped extension is connected to portions of the motor vehicle seat, there is no annular closed revenue, but the seat cover in its middle region, meaning the region of the gap being located between the seat cushion and the backrest, is additionally fixedly arranged. In this way, the desired position of the seat cover with respect to the motor vehicle seat is constantly attained. The glue or adhesive connection is preferably chosen to be disconnectable when the seat cover has to be removed from the motor vehicle seat. Undesired manipulations of the seat cover are very time-costly, or they leave visible marks on the material of the plastic film of the seat cover, especially stretching and deformation marks. Due to the glue film, the seat cover in its mounted position on the motor vehicle seat attains a tighter desired position in the region of the gap between the backrest and the seat cushion, so that the danger of portions of the pocket covering the seat cushion being laterally pulled apart or removed by a worker is eliminated. Practically, the seat cover is only removable from the motor vehicle seat after destroying the seat cover.

The glue film may include a glue having an adhesive force being great enough to cause a deformation of the plastic film of the seat cover during disconnecting the strip-shaped extension from the seat cover. The glue film can be realized in a great variety of different materials. The glue or the used adhesive material is preferably chosen to provide an adhesive connection being able to transmit a force being greater than a force being necessary to deform the plastic film.

The seat cover may include a fixing fold being formed by the front layer. The fixing fold is designed and arranged to be located in the region of the gap, and it forms the strip-shaped extension. In this embodiment, the strip-shaped extension is located at the front layer of the seat cover. The front layer is further extended to form the strip-shaped extension. The glue film being located at the strip-shaped extension may, for example, be glued to the rear layer forming the pocket for the backrest. It is also possible to connect the glue film to the rear layer forming the pocket for the seat cushion, as far as the structure of the motor vehicle seat makes this possible.

Another design possibility is that the rear layer forms the strip-shaped extension. In this case, the rear layer partially forming the backrest pocket is elongated to form the strip-shaped extension. The strip-shaped extension is formed of the material of the rear layer, and it can be moved through the gap being located between the seat cushion and the backrest from the rear to the front. Depending on the design and the arrangement of the glue film, the extension may be connected to the front layer in the region of the seat cushion, or in the region of the rear layer.

There is a great variety of possible arrangements and structures of the glue film. The glue film may, for example, be arranged in a strip-like shape or in a punctual shape. Preferably, the glue film is arranged to extend at least from a longitudinal center plane in a direction of the width of the seat cover. The glue film extends along a certain width of the seat. Preferably, it is arranged in the center region between the joints supporting the backrest. The strip-like glue film may consist of one continuous strip, or of a plurality of strip sections being spaced apart from one another. The glue film may be also realized as spaced apart dots.

The cover strip is preferably designed and arranged to be continuous, so that it can be easily grabbed and pulled off the glue film in one piece.

Another possibility is to design the glue film as a tag, as a label or as a sticker being glued to the extension. In this case, the body of the tag includes a glue film on both sides. With its one side, the body is connected to the front layer or to the rear layer of the seat cover. The cover strip is located on the other side of the body of the tag.

Another possibility is to use a hot-melt glue to form the glue film.

The rear layer partly forming the backrest pocket may be designed and arranged to be connected to the fixing fold by the glue film. It is especially easy when the extension is cut out off the material of the backrest pocket, so that its glue film then can be connected to the fixing fold. In this case, a annular revenue is formed around the backrest providing an indicator for the original status of the seat.

The glue film may be arranged on the bottom side of the extension being formed by the front layer, or on the top side of the extension being formed by the rear layer. The arrangement depends on the point in which the connection takes place. It is preferred to arrange the glue film at the free rim of the extension.

It is an object of the present invention to provide a seat cover made of plastic film being suitable for the first mounting of a vehicle.

It is another object of the present invention to provide a seat cover made of plastic film which can be easily produced by machines.

It is another object of the present invention to provide a seat cover made of plastic film which can be mounted at the producer of the seat.

It is another object of the present invention to provide a seat cover made of plastic film preventing undesired removing and sliding of the seat cover with respect to the seat.

It is another object of the present invention to provide a seat cover made of plastic film indicating undesired removing of the seat cover from to the seat.

It is another object of the present invention to provide a seat cover made of plastic film providing a proof of the seat being the original seat.

Still another object of the present invention is to provide a seat cover made of plastic film providing a sealing function of the seat.

Other objects, features and advantages of the present invention will become apparent to one with skill in the art upon examination of the following drawings and detailed description. It is intended that all such additional objects, features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 7 illustrates a top view of the rear side of a second embodiment of the seat cover.

FIG. 8 illustrates a sectional view along line VIII—VIII in FIG. 7.

FIG. 9 illustrates a side view of the seat cover according to FIG. 7 being mounted on a motor vehicle seat.

DETAILED DESCRIPTION OF THE INVENTION

Figure 1:
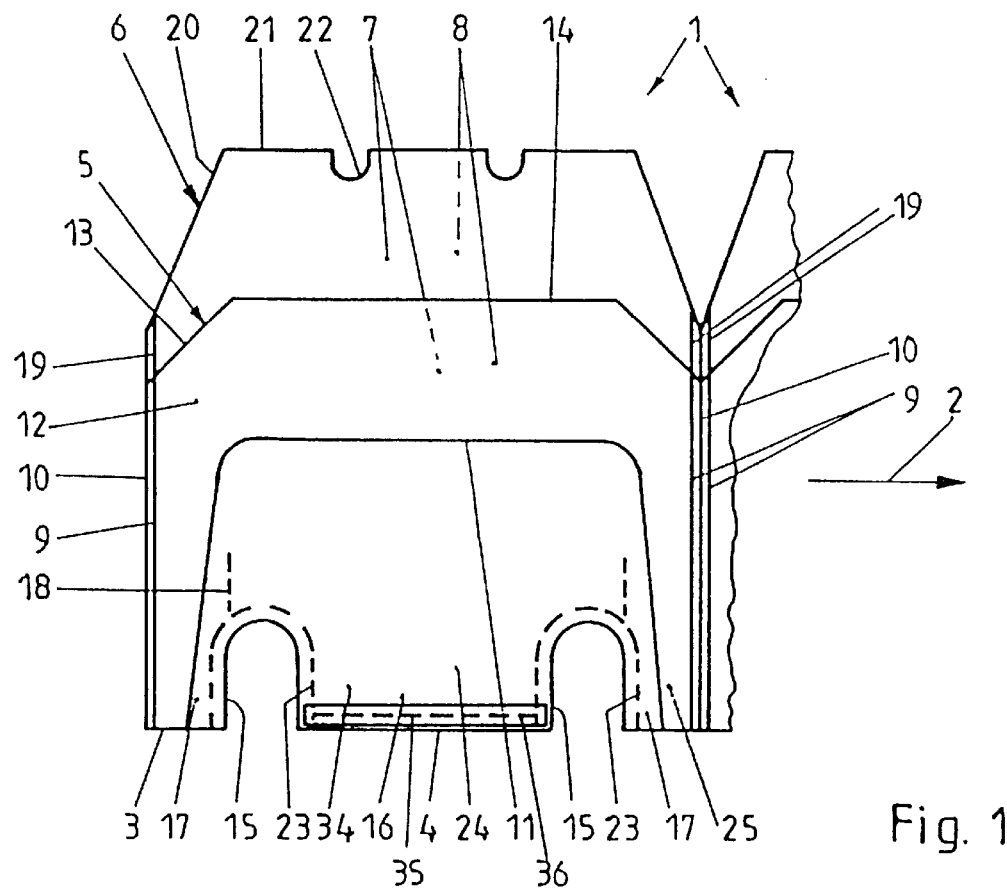
FIG. 1 illustrates a top view of a path of seat covers being connected to one another before being coiled onto a roll.

Referring now in greater detail to the drawings, the seat cover 1 being illustrated in FIG. 1 is produced in paths or webs from a plastic film having two layers. The direction of movement of the path being conveyed and processed is designated by arrow 2. After the production process, the seat covers 1 are still connected to one another, and they can be wound up to form a roll. In FIG. 1, only one complete seat cover, and a portion of an adjacent seat cover is illustrated. The path being conveyed according to arrow 2 mostly includes four layers. Each single layer is illustrated in FIGS. 2 to 5 in the order it is arranged in the path. It is also possible to completely disconnect the seat covers 1 from one another, and to arrange them in stacks.

During its production, the tubular film of plastic material is cut in a longitudinal direction. Thus, there are two free rims 3 and 4. The tubular film is folded to form four layers in substantial portions, so that the two free rims 3 and 4 are in alignment at the top and at the bottom layer. In between, there are two folds, the height of which depends on the desired height of a seat pocket 5 and a backrest pocket 6, respectively. Each pocket is formed by two layers. The two layers in the middle form a front layer 7, whereas the top and the bottom layer with their free rims 3 and 4 are part of a rear layer 8.

It is also possible to produce the seat cover 1 using four individual layers, as illustrated in FIGS. 2 to 5, instead of forming a common front layer 7 and a rear layer 8. However, it is more advantageous to start from a tubular film being cut lengthwise, and to use an additional folding step without spreading the film to form the front layer 7 and the rear layer 8.

Figure 2:
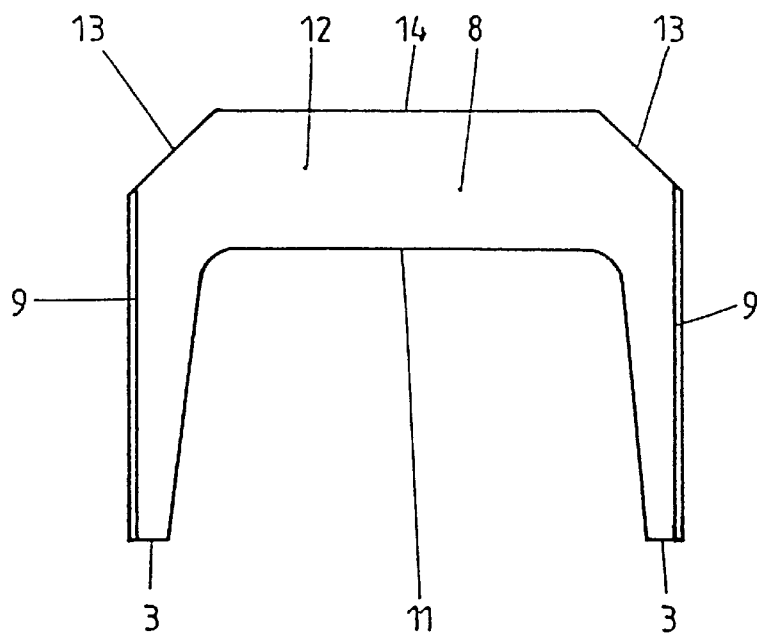
FIG. 2 illustrates a top view of the top layer of the seat cover according to FIG. 1.
Figure 3:
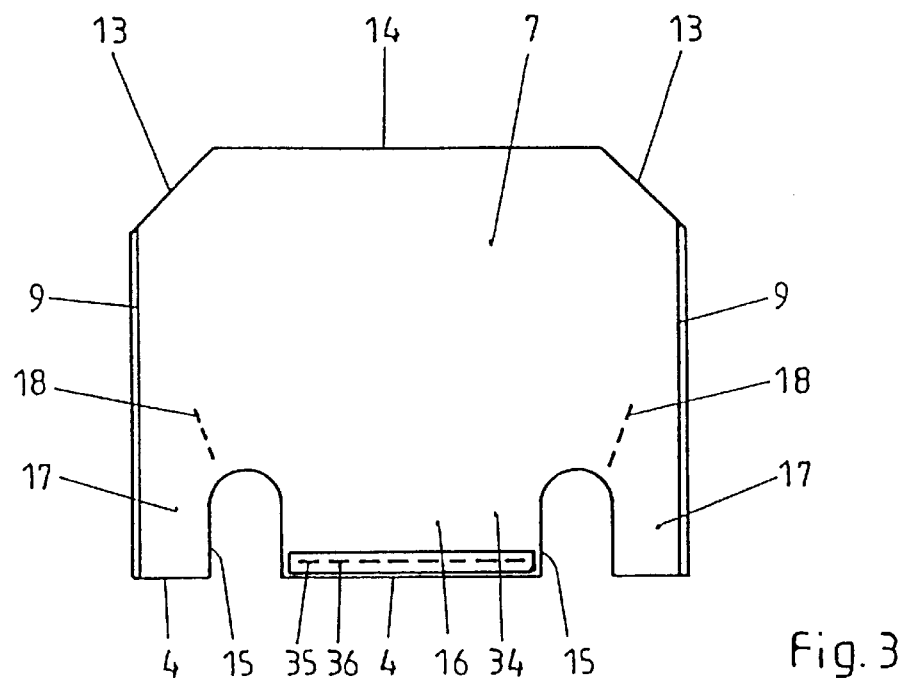
FIG. 3 illustrates a top view of the layer following the top layer of the seat cover according to FIG. 1.

As illustrated in FIGS. 1 to 3, one portion of the front layer 7 is connected to one portion of the rear layer 8 by transverse welded seams 9 to form the seat pocket 5. These transverse welded seams 9 extend in a direction transverse to the conveying direction according to arrow 2, and they exclusively connect the two upper layers to form the seat pocket 5. Adjacent transverse welded seams 9 of connected seat covers 1 are held by a perforation 10 to wind up the foil or path of seat covers 1 to a roll. Each perforation 10 is separated to take one seat cover 1 from the roll, and to mount the seat cover 1 to a motor vehicle seat. In case of the seat covers 1 being arranged in stacks, the perforations 10 are replaced by cuts.

As illustrated in FIG. 2, the bottom surface of the seat pocket 5 is formed by a portion of the rear layer 8 including a U-shaped cutout 11 being arranged parallel to and spaced apart from the rim 3 and ending at both ends in the rim 3, so that a protecting strip 12 being part of the seat cover 5 is formed by the rear layer 8. Chamfered corners 13 may be provided by separating weldings on the side opposite to the free rim 3.

The entire seat pocket 5 is formed by the portion of the rear layer 8 being illustrated in FIG. 2, and by the portion of the front layer 7 being illustrated in FIG. 3. The transverse welding seams 9 connecting the two portions are illustrated in both FIGS. 2 and 3. The chamfered corners 13 are also part of the front layer 7. The free rims 3 and 4 are not connected to one another. On the opposite side, there is a connection in the region of the rim 14 being formed by a folding line of the tubular film, or by a separating welding. The portion of the front layer 7 being illustrated in FIG. 3 includes two separating welding seams 15 in the region of the rim 4, the shape of which starts from the free rim 4, and it ends in the free rim 4. The separating welding seams 15 are spaced apart from the transverse welding seams 9 and the perforations 10, respectively. The separating welding seams 15 connect the portions of the front layer 7 being illustrated in FIGS. 3 and 4 to one another. The depth of the separating welding seams 15 corresponds to the value to which the front layer 7 is longer than the sum of the lengths of the seat cushion and the backrest to be protected. In this way, the surplus portion of the front layer 7 being located between the two separating welding seams 15 forms a fixing fold 16 serving to anchor the seat cover 1 being mounted on a motor vehicle seat in the gap being located between the seat cushion and the backrest. At the same time, protecting elements are formed from the surplus material by the separating welding seams 15 in the direction to the transverse welding seams 9. This means, that regions consisting of two layers are connected along the separating welding seams 15 and along the free rim 4, but not in an outward direction. The protecting elements 17 serve to cover the link regions of the seat, meaning the outer regions between the backrest and the seat cushion pivotally connecting the backrest to the seat cushion.

However, the protecting elements 17 are not necessarily required, and they are not essential to the invention.

The portion of the seat pocket 5 being illustrated in FIG. 3 includes perforation lines 18 each being arranged laterally adjacent to the separating welding seams 15. Depending on the position of the motor vehicle seat in a vehicle on the left side or on the right side, one of the perforation lines 18 is separated to arrange the lock of the belt, whereas the other perforation line 18 remains closed.

Figure 4:
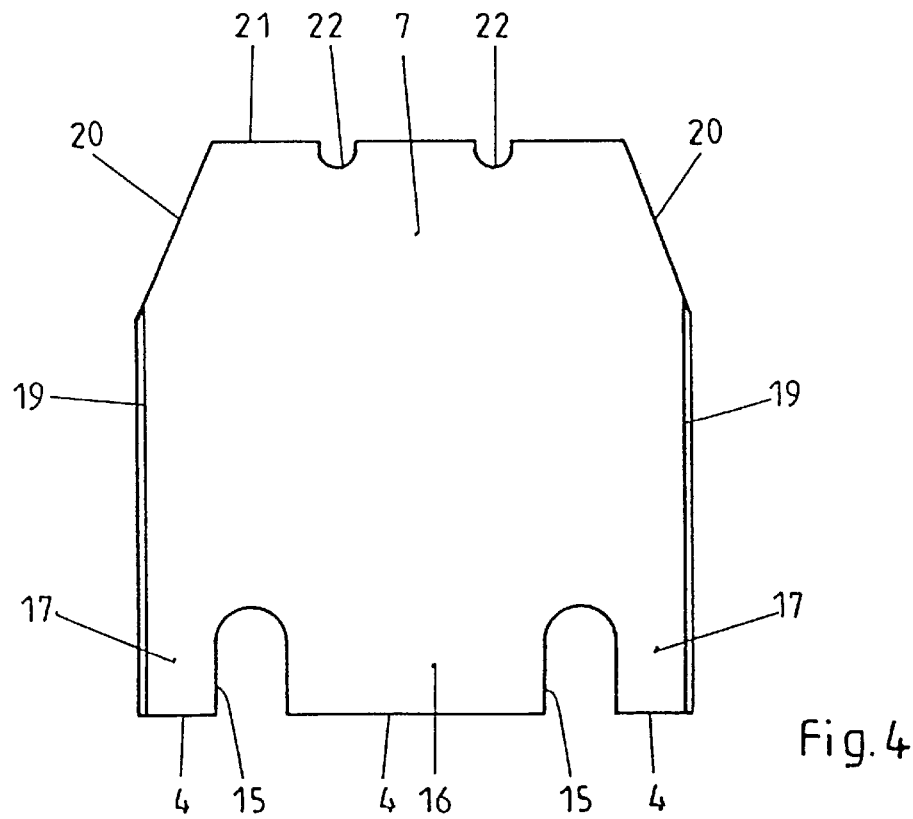
FIG. 4 illustrates a top view of the third layer of the seat cover according to FIG. 1.
Figure 5:
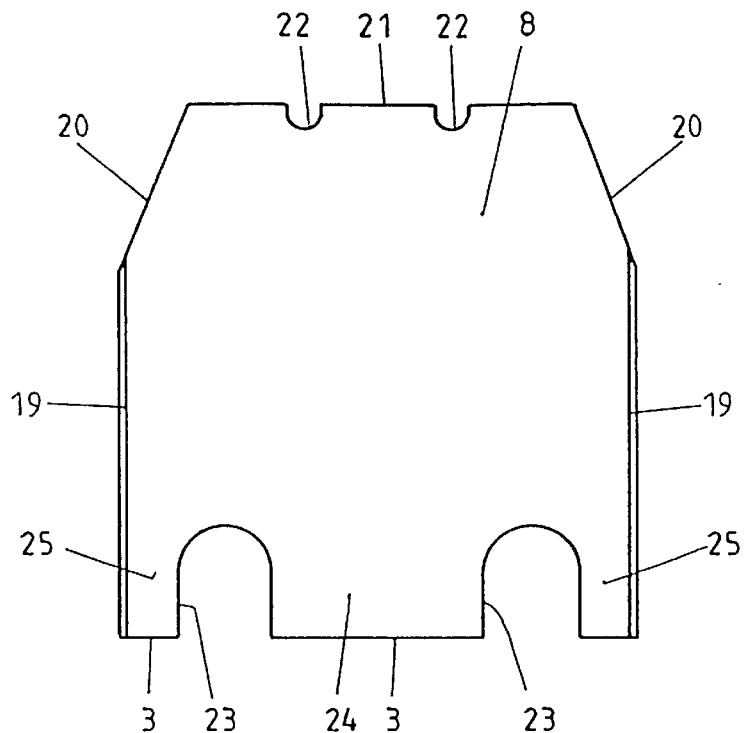
FIG. 5 illustrates a top view of the bottom layer of the seat cover according to FIG. 1.

The backrest pocket 6 is formed by the two layers being illustrated in FIGS. 4 and 5, i.e. by a portion of the front layer 7 and a portion of the rear layer 8. These two portions of the layers are connected to one another by transverse welding seams 19 extending in a direction transverse to the moving direction according to arrow 2. The backrest pocket 6 may also include chamfered corners 20 being formed by separating welding seams. The portions of the front layer 7 and of the rear layer 8 are also connected to one another in the region of the chamfered corners 20 and in the region of the common rim 21. Consequently, the backrest pocket 6 is also closed in U-shape. The backrest pocket 6 is exclusively open on the side of the free and unconnected rims 3 and 4 to be mountable on the motor vehicle seat. The rim 21 may be formed by a fold of the cut tubular film or by separating or connecting welding seams extending in a longitudinal direction. Openings 22 may be arranged in the region of the rim 21, and they are adapted to receive bars from a headrest of the seat. It is also possible to design the rim 21 and the chamfered corners 20 to enable the backrest pocket 6 to be mounted on a motor vehicle seat having an integrated headrest. Usually, the backrest pocket 6 has a greater depth than the seat pocket 5, as it can be seen especially in FIG. 1.

FIG. 5 illustrates that the portion of the rear layer 8 forming the backrest pocket 6 includes cutouts 23 extending from the free rim 3 or separable perforations, the shape of which is adapted to the transverse welding seams 15, so that the line of the cutout 23 surrounds the line of the separating welding seams 15 with a distance. This design allows for a simple production process. Due to the shape and the arrangement of the cutouts 23 and 11, although four layers are arranged, both portions of the front layer 7, as illustrated in FIGS. 3 and 4, are accessible to arrange the separating welding seams 15 from both sides. As it can be seen in FIGS. 5 and 1, the depth of the backrest pocket 6 is enlarged compared to backrest pockets known in the art. A protecting curtain 24 is formed between the cutouts 23, the protecting curtain 24 in its mounted position protecting and covering the rear portion of the seat cushion. In addition, protecting flaps 25 are formed by the cutouts 23, the protecting flaps 25 protecting the rear portion of the link region of the motor vehicle seat.

As it can be especially seen in FIGS. 1 and 3, the front layer 7 is not only designed to form the fixing fold 16. The front layer 7 also forms a strip-shaped extension 34. A glue film 35 is arranged on the bottom side of the strip-shaped extension. The glue film 35 includes a glue, an adhesive material, a bonding agent, a cement or the like. The glue film 35 is covered by a removable cover strip 36. In this embodiment, the glue film 35 extends along the width of the fixing fold 16. It is also possible that the glue film 35 extends along the protecting elements 17. This arrangement may allow for an easier applying of the glue film 35. However, the glue film 35 does not fulfil a substantial function on the protecting elements 17. The glue film 35 may be continuous or discontinuous. For example, the glue film 35 may be applied as separate strips in certain sections of the strip-like extension 34. The glue film 35 causes a great glue or adhesive effect after the cover strip 36 is removed. Usually, after the cover strip 36 is removed from the glue film 35, and the glue film 35 is connected to another portion of the seat cover, the glue film 35 cannot be disconnected from the seat cover 1 without deforming or even destroying the seat cover 1. The strip-shaped extension 34 may be formed by the fixing fold 16 without having to use additional plastic film material. Nevertheless, it is preferred to design the strip-shaped extension 34 longer than required by the fixing fold 16 being introduced into the gap 33 being located between the seat cushion 27 and the backrest 29 of the motor vehicle seat.

Figure 6:
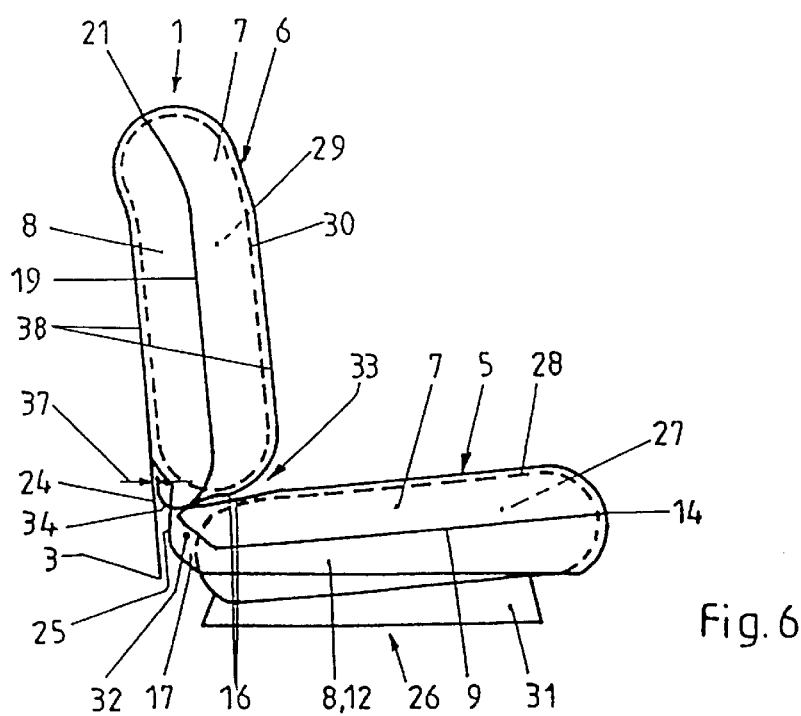
FIG. 6 illustrates a side view of the seat cover according to FIG. 1 being mounted on a motor vehicle seat.

FIG. 6 illustrates the seat cover 1 of FIGS. 1 to 5 in its mounted position on a motor vehicle seat 26. The seat 26 includes a seat cushion 27 having a seating 28. A backrest 27 includes a backrest surface to support the back of the user, meaning the person sitting on the seat 26. The seat 26 also includes a base 31 to be connected to the chassis of the motor vehicle. The backrest 29 is pivotally connected to the base 31 and to the seat cushion 27, respectively, by link regions 32 in a well known manner. Consequently, the backrest 29 can be adjusted to different angle positions. A gap 33 is arranged between the portion of the seating 28 not being usable for seating purposes and the corresponding portion of the backrest 29. After the backrest pocket 6 and the seat pocket 5 are mounted on the corresponding portions of the seat 26, the fixing fold 16 can be introduced into the gap 33 manually or by means of a tool. The transverse welding seams 9 and 19 and the position of the protecting strip 12 covering and surrounding the side regions and the lower regions of the seat cushion 29 can be seen from FIG. 6.

It can be also seen from FIG. 6 how the fixing fold 16 may be moved through the gap 33 starting from the front portion of the seat 26 and moving it in the direction of the rear portion of the seat 26. After the fixing fold 16 has been completely moved through the gap 33, the cover strip 36 is removed from or pulled off the glue film 35, and the end of the strip-shaped extension 34 is brought into contact with and glued to the protecting curtain 24 of the rear layer 8. Consequently, there is an adhesive connection 37 being illustrated by arrows. The adhesive connection 37 cannot be opened without destroying or at least deforming the material of the seat cover 1. Thus, an annular closed revenue 38 being formed by portions of the seat cover 1 and covering the backrest 27 and serving as a quality seal for the seat 26 is attained by the adhesive connection 37. At the same time, the glue film 35 being arranged at the adhesive connection 37 allows for the seat cover 1 in its mounted position on the seat 26 being better held in the region of the gap 33. Any pulling movement being applied onto the seat pocket 5 causes the plastic foil to be stretched and to be deformed. Consequently, such manipulations taking place are easy to be proved.

The protecting curtain 24 hangs downwardly, and it still fulfils its protecting function for the backward portion of the seat cushion 27. It is also possible to arrange the glue film 35 on an even longer extension 34. In this embodiment, the glue film 35 is applied on the top side of the extension 34. The length of such an extension 34 can be chosen to form the adhesive connection 37 in the rear portion of the base 31. In this case, the extension 34 is adhesively connected to the base 31 instead of being connected to a portion of the seat cover 1. In this way, tightening of the seat cover 1 in the region of the gap 33, a sealing effect and a proof of the seat 26 being the original seat, respectively, is attained. It is also possible to design the protecting curtain 24 to be longer and to form the extension 34. The free end of the protecting curtain 24 could be provided with a glue film 35. In this case, the free end of the protecting curtain 24 is connected to the rear portion of the base 31 of the seat 26.

FIGS. 7 to 9 illustrate another embodiment of the seat cover 1 being formed by the front layer 7 and the rear layer 8 being laterally connected at the rims 3 and 4 by transverse welding seams 19. A strip-shaped extension 34 is partly formed by a U-shaped cut 39, and partly by a perforation 40 in the center region of the rear layer 8, i.e. in the region of the gap 33 being located between the seat cushion 27 and the backrest 29 (FIG. 9). A series of punctual glue films 35 is arranged at two places of the outside of the strip-shaped extension 34, the glue films 35 each being covered by a cover strip 36. It can be seen in FIG. 9 that the gap 33 being located between the seat cushion 27 and the backrest 29 has dimensions of several centimeters. Thus, it is not possible to fix the seat cover 1 by jamming it in the gap 33. Consequently, after mounting the seat cover 1 on the seat 26, it is especially advantageous to remove both cover strips 36, and to move the strip-shaped extension 34 through the gap 33 from the rear to the front and into the backrest pocket 6, so that the adhesive connections 37 can be formed. Again, an annular revenue 38 surrounding the backrest 29 is attained. The strip-shaped extension 34 may also be designed to be shorter, so that only one adhesive connection 37 is formed.

Figure 10:
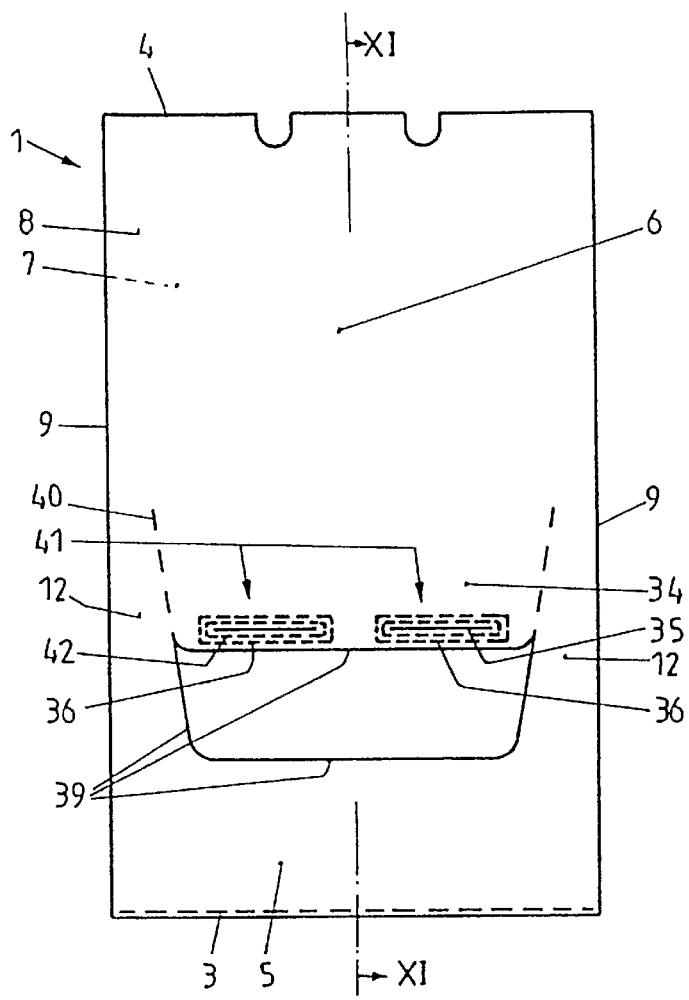
FIG. 10 illustrates a top view of the rear side of a third embodiment of the seat cover.
Figure 11:
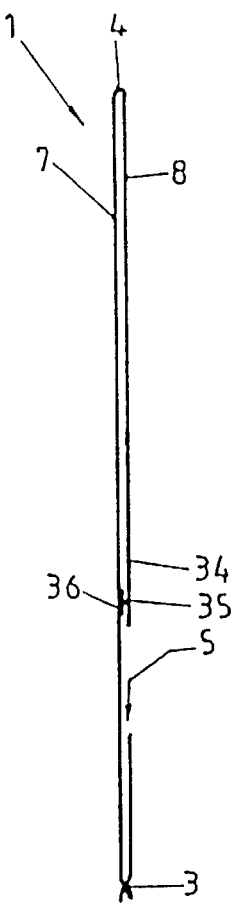
FIG. 11 illustrates a sectional view along line XI—XI in FIG. 10.
Figure 12:
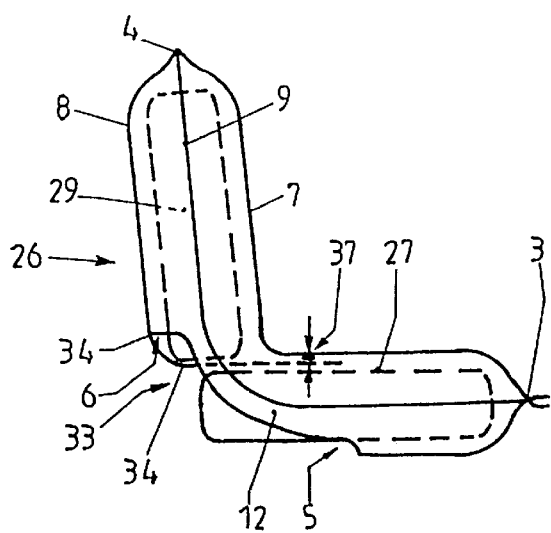
FIG. 12 illustrates a side view of a motor vehicle seat with a mounted and glued seat cover according to FIG. 10.

A similar embodiment of the seat cover 1 is illustrated in FIGS. 10 to 12. In this embodiment, the strip-shaped extension 34 is designed to be relatively short by forming a cutout through the cut 39. Two labels or tags 41 are located on the inner surface of the extension 34. The tags 41 include a body 42 being glued to the material of the extension 34. On the opposite side of the body 42, a glue film 35 is provided. The glue film 35 is covered by the cover strips 36. The body 42 of the tag 41 includes an adhesive coating on each of its sides. With its one side, the body 42 is glued to the material of the strip-shape extension 34. The other side of the body 42 of the tag 41 is covered by the cover strip 36.

It can be also seen from FIG. 12 that the gap 33 is designed to have relatively great dimensions, so that in this case, it is also not possible to fix the extension 34 of the seat cover 1 in the gap 33 by jamming it in the gap 33. After sliding the seat cover 1 over the motor vehicle seat 26, the cover strip 36 is removed in the region of both tags 41, and the extension 34 is moved through the gap 33 from the rear to the front, so that the extension 34 can be adhesively attached to the inner surface of the front layer 7 in the region of the seat cushion 27. The adhesive connection 37 is formed in this region.

Figure 13:
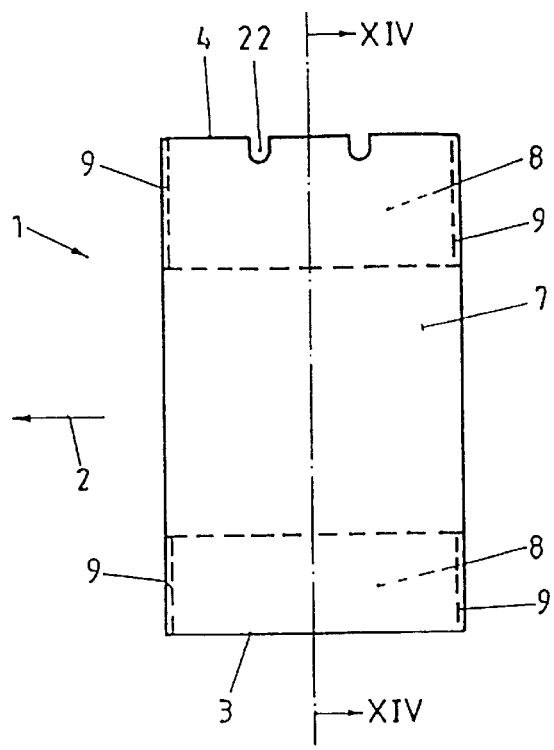
FIG. 13 illustrates a top view of the rear side of another embodiment of the seat cover.
Figure 14:
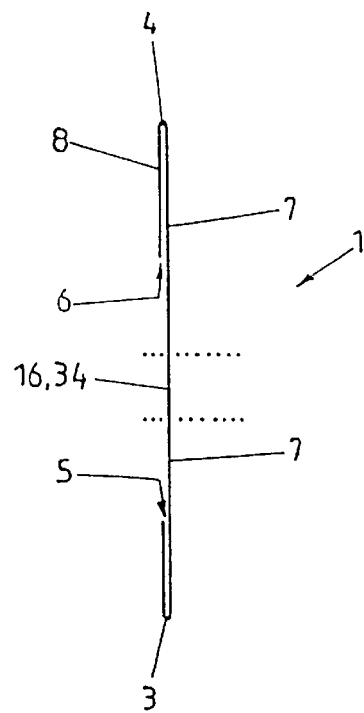
FIG. 14 illustrates a sectional view along line XIV—XIV in FIG. 13.
Figure 15:
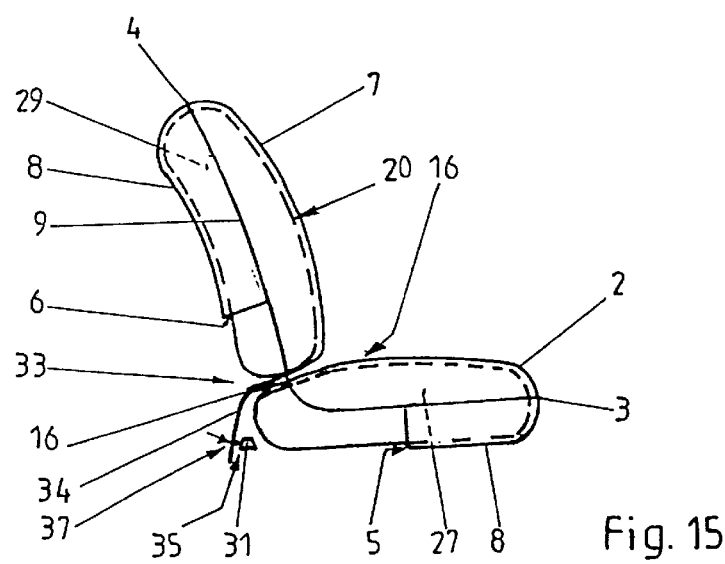
FIG. 15 illustrates a side view of the seat cover according to FIG. 13 being mounted on a motor vehicle seat.

Finally, FIGS. 13 to 15 illustrate another preferred embodiment of the seat cover 1. A top view of the continuous front layer 7 is illustrated. The rear layer 8 only includes two pieces, so that a seat pocket 5 and a backrest pocket 6 is formed. The front layer 7 in its center region is designed to be relatively long. It does not only form the fixing fold 16, but it is additionally enlarged including two layers to form a strip-shaped extension 34. The strip-shaped extension 34 is designed to be long enough to extend beyond the gap 33, so that the adhesive connection 37 may be located at the transverse support of the base 31 of the motor vehicle seat 26. With this arrangement, no annular closed revenue is formed, but a sealing effect and a proof for the motor vehicle seat 26 being the original seat, respectively, is attained. The seat cover 1 is fixedly arranged in the region of the gap 33, so that an undesired movement of the seat cover 1, especially in the region of the seat pocket 5, is prevented. Neither extensive use during the assembly of the motor vehicle nor unusual abuse of the seat cover 1 can cause the seat cover 1 to substantially move without the material of the seat cover 1 being stretched or deformed. Thus, it is easily possible to determine whether or not a seat cover 1 has been manipulated.

I claim:

1. A temporary seat cover for a motor vehicle seat for protecting a motor vehicle seat including a seat cushion, a backrest, and a gap being located between a seat cushion and a backrest, said seat cover comprising;

a front layer made of plastic film to extend along a seat cushion and a backrest in the mounted position of said seat cover on a motor vehicle seat;

a rear layer made of plastic film and being connected to said front layer by transverse welding seams;

a backrest pocket for the reception of at least a portion of a backrest, said backrest pocket being formed by said front layer and said rear layer;

a seat pocket for the reception of at least a portion of a seat cushion, said seat pocket being formed by said front layer and said rear layer;

a strip-shaped extension being connected to one of said layers and being designed and arranged to be moved through a gap being located between a seat cushion and a backrest; and a glue film being arranged on said strip-shaped extension and being covered by a removable cover strip.

2. The seat cover of claim 1, wherein said strip-shaped extension is designed and arranged to be connected to said seat cover by said glue film after taking said cover strip off said glue film.

3. The seat cover of claim 1, wherein said strip-shaped extension has a free rim and said glue film is arranged at said free rim.

4. The seat cover of claim 1, wherein said glue film has the shape of spaced apart dots arranged to extend at least from a longitudinal centre plane in a direction of the width of said seat cover.

5. The seat cover of claim 1, wherein said glue film is formed as a tag being glued to said strip-shaped extension.

6. The seat cover of claim 1, wherein said glue film includes a hot-melt glue.

7. The seat cover of claim 1, wherein said glue film has the shape of a continuous strip and it is arranged to extend at least from a longitudinal centre plane in a direction of the width of said seat cover.

8. The seat cover of claim 1, wherein said glue film has a punctual shape and it is arranged to extend at least from a longitudinal centre plane in a direction of the width of said seat cover.

9. The seat cover of claim 1, wherein said strip-shaped extension is designed and arranged to be connected to said motor vehicle seat by said glue film after taking said cover strip off said glue film.

10. The seat cover of claim 9, wherein said glue film includes a glue having an adhesive force being great enough to cause a deformation of said plastic film of said seat cover during disconnecting said strip-shaped extension from said seat cover.

11. The seat cover of claim 1, wherein said rear layer forms said strip-shaped extension.

12. The seat cover of claim 11, wherein said glue film is arranged on the top side of said strip-shaped extension.

13. The seat cover of claim 1, further comprising a fixing fold being formed by said front layer, said fixing fold being designed and arranged to be located in the region of the gap and forming said strip-shaped extension.

14. The seat cover of claim 13, wherein said rear layer is designed and arranged to be connected to said fixing fold by said glue film.

15. The seat cover of claim 13, wherein said glue film is arranged on the bottom side of said strip-shaped extension.

* * * * *